United States Patent
Paek et al.

(10) Patent No.: US 7,493,463 B2
(45) Date of Patent: Feb. 17, 2009

(54) CODE SIZE REDUCTION METHOD THROUGH MULTIPLE LOAD/STORE INSTRUCTIONS

(75) Inventors: Yun-Heung Paek, Seoul (KR); Jun-seo Lee, Seoul (KR); Jin-oo Joung, Yongin-si (KR); Min-wook Ahn, Seoul (KR); Jun-sik Choi, Mungyeong-si (KR); Doo-san Cho, Goyang-si (KR)

(73) Assignees: Samsung Electronics Co., Ltd., Suwon-Si (KR); Seoul National University Industry Foundation, Seoul (KR)

( * ) Notice: Subject to any disclaimer, the term of this patent is extended or adjusted under 35 U.S.C. 154(b) by 321 days.

(21) Appl. No.: 11/189,793

(22) Filed: Jul. 27, 2005

(65) Prior Publication Data

US 2006/0026581 A1 Feb. 2, 2006

(30) Foreign Application Priority Data

Jul. 27, 2004 (KR) .................. 10-2004-0058555

(51) Int. Cl.
*G06F 13/00* (2006.01)

(52) U.S. Cl. .................. 711/170; 711/152; 711/157

(58) Field of Classification Search .................. 711/152, 711/157, 165, 170
See application file for complete search history.

(56) References Cited

U.S. PATENT DOCUMENTS

| 5,153,591 | A | * | 10/1992 | Clark | 341/51 |
| 5,752,243 | A | * | 5/1998 | Reiter et al. | 707/3 |
| 5,822,574 | A | * | 10/1998 | Tran | 712/233 |
| 5,991,815 | A | * | 11/1999 | Prater et al. | 709/239 |
| 2002/0156914 | A1 | * | 10/2002 | Lo et al. | 709/238 |
| 2005/0069314 | A1 | * | 3/2005 | De Patre et al. | 398/5 |

* cited by examiner

*Primary Examiner*—Reba I Elmore
(74) *Attorney, Agent, or Firm*—Staas & Halsey LLP

(57) ABSTRACT

A method to transfer a plurality of data stored in a memory using one instruction. In a memory including at least two regions to which the addresses are assigned respectively, data are allocated to the addresses in sequence, and the allocated data are transferred using one instruction. At least one block is generated, which transfers data using one instruction, and it is instructed to include the data in the at least one block. The data in the block are linked with each other, and the number of paths linking two data is calculated with respect to the at least one block. The data are linked using shortest paths in consideration of the number of the linking paths, and the data are allocated by the addresses using the shortest paths.

12 Claims, 4 Drawing Sheets

(B1)

(B2)

(B3)

(B4)

(B1)

(B2)

(B3)

(B4)

CODE SIZE REDUCTION METHOD THROUGH MULTIPLE LOAD/STORE INSTRUCTIONS

CROSS-REFERENCE TO RELATED APPLICATION

This application claims the benefit of Korean Patent Application No. 2004-58555 filed on Jul. 27, 2004 in the Korean Intellectual Property Office, the entire disclosure of which is incorporated herein by reference.

BACKGROUND OF THE INVENTION

1. Field of the Invention

The present invention generally relates to a code size reduction method. More specifically, embodiments of the present invention relate to a method to reduce a code size by minimizing the number of times data is moved between a memory and a register.

2. Description of the Related Art

Generally, a central processing unit (CPU) carries out prescribed processes such as operations by use of data stored in a memory. To this end, the CPU utilizes data written in a register that is connected with the CPU, rather than directly using the data in the memory. The data in the memory is written in the register before the CPU utilizes the data in the memory. After carrying out the prescribed processes using the data written in the register, the CPU writes result data acquired from the processes to the register. The result data in the register is stored in the memory according to a given instruction. In short, the CPU has to utilize the register in order to use the data in the memory. The memory and the register respectively are divided into a plurality of regions.

Addresses are assigned to the regions, respectively. FIG. 1 illustrates constructions of the memory and the register. The register is divided into 16 regions, and each region is assigned an address. Addresses r0 through r15 are sequentially assigned to the regions of the register. Likewise, the memory includes divided regions that are assigned addresses, respectively, as in the register. As the size of the memory can vary according to a user's setting, the number of the divided regions also differs. In FIG. 1, one memory is divided into a plurality of regions, and the divided regions are assigned addresses 0x00, 0x04, 0x08, 0x0c, . . . , and so forth.

The following explains how the data stored in the memory is moved to the register. According to an instruction, data stored in a certain region (address) among the data in the memory is transferred to a specific region (address) of the register. Hereinafter, it is described that the term 'address' denotes the region to which the given address is assigned. For instance, the data in the address 0x00 of the memory is transferred to and written in the address r0 of the register according to a first instruction. The data in the address 0x04 of the memory is transferred to and written in the address r1 of the register according to a second instruction. A third instruction causes the data in the address 0x08 of the memory to be transferred to and written in the address r2 of the register. To summarize, one unit of data is moved into the register according to one instruction.

The CPU performs prescribed processes using the data written in the register, and rewrites result data corresponding to the processes in the register. The result data in the register are moved to the memory one by one according to a single instruction. To overcome this complexity, a solution is under discussion to transfer more than one unit of data using one instruction, which is referred to as a multiple load/store (MLS).

MLS is described in detail. MLS enables transfer of at least two units of data in the memory to the register using one instruction. However, MLS requires that the addresses of the data read from the memory be arranged in sequence. By way of specific example, given that three data are read from the data stored in the address 0x08, the addresses of the read data are 0x08, 0x0c, and 0x10. Note that the read data are written in contiguous addresses of the register. For example, if the read data are written in addresses starting from r1, the addresses storing the read data become r1, r2, and r3.

In light of the background, the aforementioned requirements should be satisfied to attain MLS. However, it is very rare to read contiguous data from the memory. The data allocated to the addresses of the memory and the register may be rearranged through operations so as to meet the requirement of read data being arranged in sequence, but this solution causes too many operations for the rearrangement.

SUMMARY OF THE INVENTION

The present invention has been provided to address the above-mentioned and other problems and disadvantages occurring in the conventional arrangement. An aspect of the present invention provides a method for satisfying requirements to carry out a multiple load/store (MLS).

Another aspect of the present invention provides a method for satisfying MLS requirements so as to minimize the number of times data is transferred, and reduce a code size.

To achieve the above aspects and/or features of the present invention, a method for allocating data to addresses in a memory including at least two regions to which the addresses are assigned respectively, includes generating at least one block that transfers data using one instruction, and instructing to include the data in the at least one block, linking the data in the block with each other, and calculating the number of paths linking two data with respect to the at least one block, linking the data using shortest paths in consideration of the number of the linking paths, and allocating the data by the addresses using the shortest paths.

Additional aspects and/or advantages of the invention will be set forth in part in the description which follows and, in part, will be apparent from the description, or may be learned by practice of the invention.

BRIEF DESCRIPTION OF THE DRAWINGS

These and/or other aspects and advantages of the invention will become apparent and more readily appreciated from the following description of exemplary embodiments, taken in conjunction with the accompanying drawing figures of which.

DETAILED DESCRIPTION OF THE PREFERRED EMBODIMENTS

Figure 1:
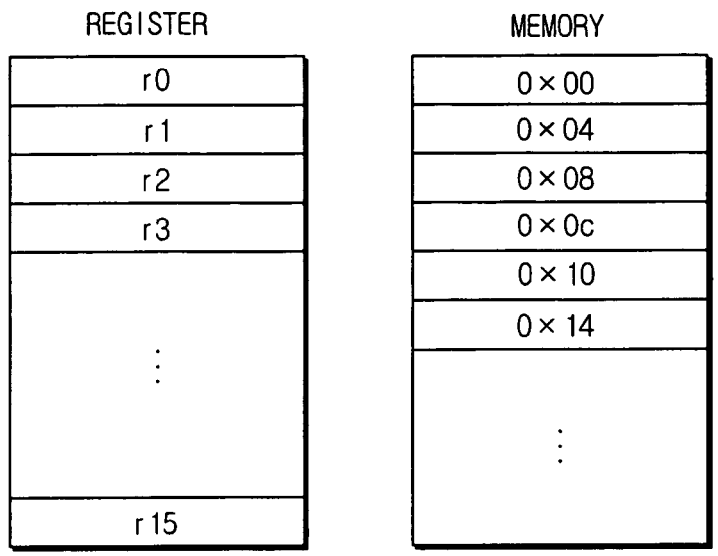
FIG. 1 is a schematic representation of a memory and a register that are assigned addresses according to a conventional method.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
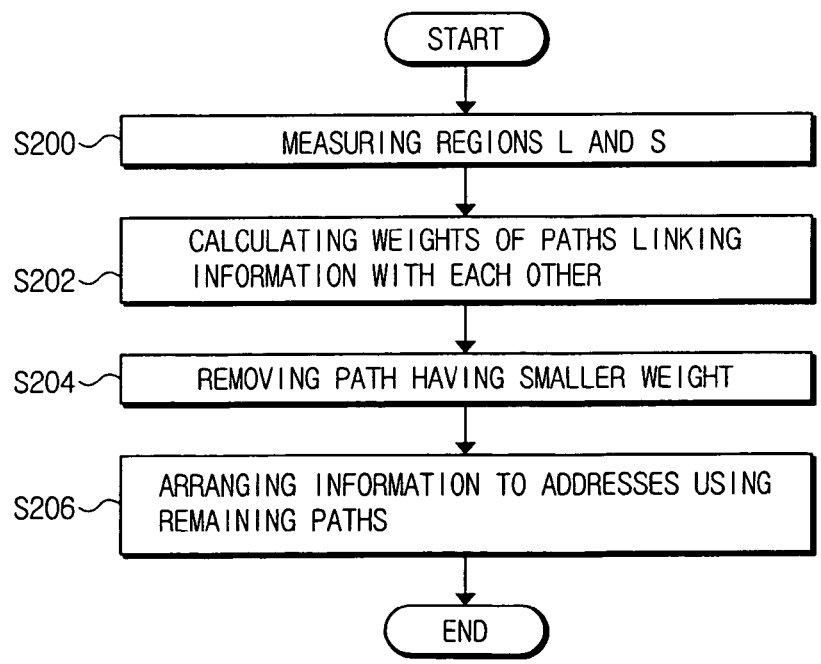
FIG. 2 is a flowchart of a process of allocating data to addresses of a memory and a register, respectively, according to an embodiment of the present invention.

FIG. 2 is a flowchart of processes to reduce a code size according to an embodiment of the present invention, which are explained. Regions L and S are measured (S200). The regions L and S will be described in detail below.

In an embodiment, weights are calculated with respect to paths linking data to be transferred between a memory and a register (S202). The weight is represented as the number of times that two units of data are transferred using one instruction. FIG. 1 depicts there are 16 regions in the register, but registers are not necessarily limited to this number of regions. It is to be understood that the number of regions in the register may differ according to a user's setting.

The path(s) having the smallest weight among the weights along each path is/are removed (S204). The data should be linked along the smallest number of paths, and unnecessary paths linking data are removed according to their weights, which will be described in detail.

The units of data are allocated to the addresses, respectively, using the remaining paths (S206). Thus, data allocation can realize MLS. The following description is provided in reference to FIG. 2.

Suppose that prescribed processes of a central processing unit (CPU) perform the following operations according to Program 1.

```
...
a = a + b − c + d;
if (a > b) {
    qstring (a, b);
    f = f − d;
}
else {
    qstring (a, b);
    f = a + b;
    d = b + d;
    e = a + f;
}
f = d + a;
d = f − d;
...
```

Program 1 can be expressed in relation with the register (register address) as the following Program 2.

B1-0 r0=a;
B1-1 r1=b;
B1-2 r2=c;
B1-3 r0=r0+r1;
B1-4 r0=r1−r2;
B1-5 r2=d;
B1-6 r0=r0+r2;
B1-7 a=r0;
B1-8 go to L1 if r0≦r1;
B2-0 r1=r2;
B2-1 call qstring;
B2-2 r0=f;
B2-3 r1=d;
B2-4 r0=r0−r1;
B2-5 f=r0;
B2-6 goto L2
B3-0 L1 call qstring
B3-1 r0=a;
B3-2 r2=b;
B3-3 r3=d;
B3-4 r1=r0+r2;
B3-5 f=r1
B3-6 r0=r0+r1;
B3-7 r2=r2+r3;
B3-8 e=r0;
B3-9 d=r2;
B4-0 L2 r0=d;
B4-1 r2=a;
B4-2 r1=r2+r0;
B4-3 r2=r1−r0;
B4-4 d+r2;
B4-5 f=r1;

The following explains a time to write data into the register so as to perform the above operations using Program 2.

Program 2 consists of B1 through B4. The description is first made of B1. A time to write data a in the register for the sake of the operations is between B1-0 and B1-2. If the data a is written in the register within B1-2, the CPU can execute the operations. A time to write data b in the register for the operations is between B1-0 and B1-2. A time to write data c in the register for the operations is between B1-0 and B1-3. A time to write data d in the register for the operations is between B1-0 and B1-5. Accordingly, a time to transfer the data a through the data d from the memory to the register using one instruction is between B1-0 and B1-2. Result data a from the CPU is written in the register at B1-7.

Hereinafter, B2 is explained. A time to write data f in the register for the operations is between B2-0 and B2-3. A time to write data d in the register for the operations is between B2-0 and B2-3 as well. Hence, a time to transfer the data f and the data d from the memory to the register using one instruction is between B2-0 and B2-3. Result data f from the CPU is written in the register at B2-5 so as to transfer to the memory.

As for B3, a time to write the data a in the register for the operations is between B3-0 and B3-3. A time to write the data d in the register for the operations is between B3-0 and B3-3. A time to write the data d in the register for the operations is between B3-0 and B3-6. A time to transfer the data a, b, and d from the memory to the register using one instruction is between B3-0 and B3-3.

Result data f provided from the CPU is written in the register at B3-5 so as to transfer to the memory. Result data e from the CPU is written in the register at B3-8 so as to transfer to the memory. Result data d provided from the CPU is written in the register at B3-9 so as to transfer to the memory. Therefore, a time to transfer the result data f, e, and d from the register to the memory using one instruction is B3-9.

As for B4, a time to write the data d in the register for the operations is between B4-0 and B4-1. A time to write the data a in the register for the operations is between B4-0 and B4-1 as well. A time to transfer the data d and the data a from the memory to the register using one instruction is between B4-0 and B4-1.

The time to transfer the data using one instruction in each block have been illustrated. Hereinafter, data allocation to the addresses of the memory or the register is explained. As mentioned above, to transfer data using one instruction, the addresses of the memory or the register storing the data should be contiguous.

Figure 3:
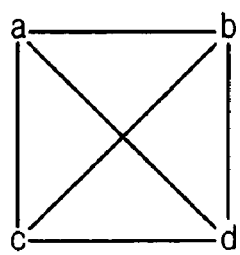
FIG. 3 is a schematic representation of data which can be transferred by blocks using one instruction according to an embodiment of the present invention.
Figure 3:
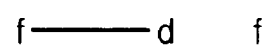
Figure 3:
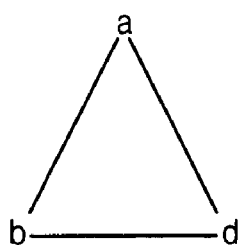
Figure 3:
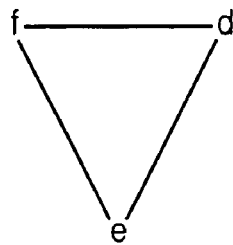
Figure 3:

FIG. 3 is a schematic representation illustrating data to be transferred using one instruction, and paths linking the data, according to an embodiment of the present invention. The paths linking the data with each other in the respective blocks are first described.

In (B1), data a, b, c, and d are transferred using one instruction. Paths linking data a, b c, and d are depicted in (B1) of FIG. 3. In addition, result data a provided from the CPU is illustrated.

In (B2), data f and data d are transferred using one instruction. Paths linking data f and data d are depicted in (B2) of FIG. 3. Result data f provided from the CPU is also illustrated.

In (B3), data a, b, and d are transferred using one instruction. Paths linking data a, b, and d are depicted in (B3) of FIG. 3. In addition, paths linking result data f, d, and e provided from the CPU are shown.

In (B4), data a and data d are transferred using one instruction. Paths linking data a and data d are depicted in (B4) of FIG. 3. In addition, paths linking data a and b provided from the CPU are shown.

Figure 4A:
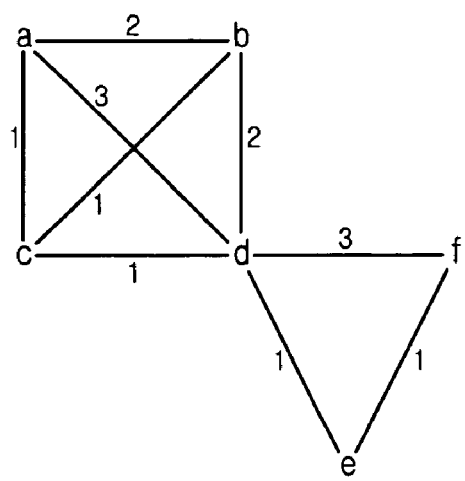
FIGS. 4A and 4B are schematic representations of data which can be transferred using one instruction and are linked with each other, and weights given to each path, according to an embodiment of the present invention.

FIG. 4A is a schematic representation illustrating weights of paths in reference to FIG. 3. Hereinafter, the result data and the data are regarded the same.

The path linking data a and data b, as shown in (B1) and (B3) of FIG. 3, has a weight of 2. The path linking data a and data c, as shown in (B1) of FIG. 3, has a weight of 1. The path linking data a and data d, as shown in (B1), (B3), (B4) of FIG. 3, has a weight of 3. The path linking data d and data f, as shown in (B2), (B3), (B4) of FIG. 3, has a weight of 3. In the same manner, the weights given to the respective paths of FIG. 4A are obtained.

Figure 4B:
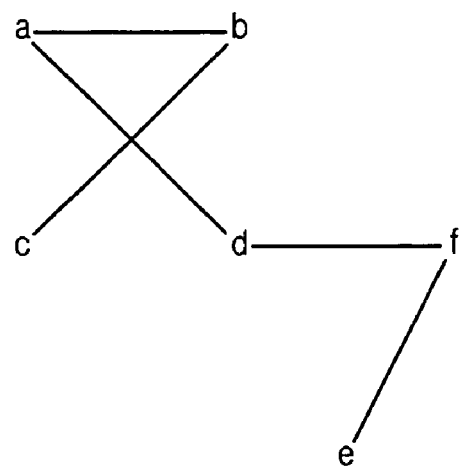

FIG. 4B is a schematic representation illustrating that all of the data units are linked using the shortest paths. The other paths (those excluding the selected paths in FIG. 4B) are erased from FIG. 4A. Some paths are removed based on the weights of the paths. That is, a path having a smaller weight is first removed. As a result, the paths having higher use frequency remain. In FIG. 4B, the path between data a and data c, the path between data c and data d, the path between data b and data d, and the path between data d and data e are removed.

Figure 5:
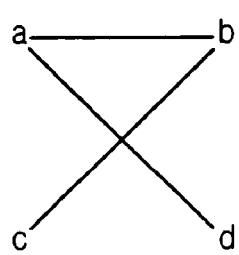
FIG. 5 is a schematic representation of data, which can be transferred using one instruction, being linked along shortest paths, according to an embodiment of the present invention.
Figure 5:
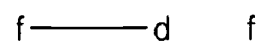
Figure 5:
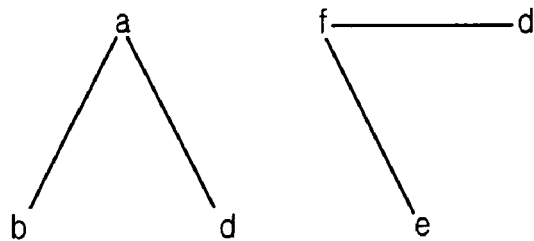
Figure 5:

FIG. 5 is a schematic representation illustrating the data of FIG. 3 being linked with each other in reference to FIG. 4B.

(B1) includes a path between data a and data b, a path between data b and data c, a path between data a and data d, and data a. (B2) includes a path between data f and data d, and data f. (B3) includes a path between data a and data b, and a path between data a and data d. (B3) further includes a path between data f and data d, and a path between f and data e. (B4) includes a path between data a and data d, and a path between data d and data f.

The following Table 1 shows data allocated to the respective addresses of the memory by use of the paths of FIG. 5.

TABLE 1

| Address | Data |
|---|---|
| 0x00 | Data c |
| 0x04 | Data b |
| 0x08 | Data a |
| 0x0c | Data d |
| 0x10 | Data f |
| 0x14 | Data e |

By allocating the data to the respective addresses of the memory as shown in Table 1, a plurality of data can be transferred using one instruction. Specifically, data a through data d required for (B1) are read from the memory addresses 0x00 through 0x0c at one time. The data required for (B2) through (B4) can be read from the relevant addresses at one time.

According to the present invention, a plurality of data can be efficiently transferred using a single instruction. The data are allocated to addresses of the memory in sequence so as to transfer the data using one instruction. Therefore, the size of the code instructing the data transfer can decrease, and the size of the memory storing the code can be reduced.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method for allocating data to addresses in a memory including at least two regions to which the addresses are allocated respectively, the method comprising:
   generating at least one block capable of transferring two or more data units to separate regions of a register from the at least two regions of the memory using one instruction, and including the two or more data units in the at least one block;
   linking the two or more data units in the block with each other, and calculating a number of paths linking two data units with respect to the at least one block;
   linking the two or more data units using shortest paths in consideration of the number of the linking paths;
   allocating the two or more data units to the at least two regions of the memory by the addresses using the shortest paths; and
   storing the two or more data units in the at least two regions of the memory according to the allocating.

2. The method according to claim 1, wherein the data are linked with each other using paths having a larger number of the paths.

3. The method according to claim 1, wherein the data in one block are sequentially allocated a specific address.

4. The method according to claim 3, wherein a time to transfer the data of the respective blocks is determined, and the data of the at least one block are transferred at a common time.

5. The method according to claim 1, wherein data provided from the memory are transferred to the separate regions of the register.

6. The method according to claim 5, wherein the data from the memory are sequentially written starting from a certain address of the register.

7. A method for allocating data to addresses in a memory including at least two regions to which the addresses are allocated respectively, the method comprising:
   identifying relationships between the at least two data units;
   associating the at least two data units into at least one block based on the identified relationships; and
   transferring the associated block between separate regions of a processing unit and the at least two regions of the memory using a single instruction so as to minimize a number of data transfers and reduce a code size, wherein the data in the associated block is stored in the memory upon being transferred.

8. The method of claim 7, wherein the relationships comprise path values.

9. The method of claim 7, wherein the processing unit comprises a central processing unit and the storage comprises a register.

10. A data transfer method between a processing unit and a storage having at least two regions, the method comprising:

calculating a weight of a path between at least two units of data to be moved between separate regions of the processing unit and the at least two regions, wherein the weight represents the number of times that the at least two units of data are transferred using one instruction;

linking the at least two units of data according to the calculated weight; and transferring the at least two units of data between the separate regions of the processing unit and the at least two regions of the storage using a single instruction so as to minimize a number of data transfers and reduce a code size, wherein the at least two units of data are stored in the storage upon being transferred.

11. The method of claim 10, wherein the linking of the at least two units of data according to the calculated weight comprises:

linking the at least two units of data along paths having a higher weight.

12. The method of claim 10, wherein the processing unit comprises a central processing unit and the storage comprises an external memory.

* * * * *